United States Patent

[11] 3,593,184

[72] Inventor Jose Luis Herrero
 Mountain View, Calif.
[21] Appl. No. 878,463
[22] Filed Nov. 20, 1969
[45] Patented July 13, 1971
[73] Assignee The Singer Company
 New York, N.Y.

[54] COMB MARKER GENERATING APPARATUS FOR SIMULTANEOUSLY PROVIDING A PLURALITY OF MARKER PULSES AT DIFFERENT INDIVIDUALLY IDENTIFIABLE MARKER INTERVALS
14 Claims, 5 Drawing Figs.

[52] U.S. Cl. .................................................. 331/38,
 324/77 B, 324/79 R, 328/189, 331/44
[51] Int. Cl. ........................................................ H03b 21/02,
 H03k 3/00
[50] Field of Search ........................................... 328/189;
 324/79 R, 121, 77 B; 331/37, 38, 40, 44

[56] References Cited
UNITED STATES PATENTS
3,427,536 2/1969 Wainwright .................. 328/189 X Primary Examiner—Roy Lake
Assistant Examiner—Siegfried H. Grimm
Attorney—Harvey G. Lowhurst ABSTRACT: Comb marker generator apparatus for simultaneously providing a number of sets of marker pulses having different marker intervals and having marker interval identifiable characteristics. A means is provided for generating a harmonic spectrum of a reference frequency high enough to make it a simple matter to obtain enough harmonics to cover the desired frequency range. This harmonic spectrum is then mixed with an unknown signal to provide a difference frequency from which marker pulses at the reference frequency can be generated. Marker pulses at frequency intervals of less than the selected reference frequency are provided by mixing one or more submultiples of the reference frequency with said difference frequency to provide pulses which can then be added to the reference frequency pulses to simultaneously provide markers at several frequency intervals. Means are provided at each source for controlling the amplitude or other characteristic of a set of pulses so that a set of pulses at one marker interval can be distinguished from those of other marker intervals.

PATENTED JUL 13 1971 3,593,184
SHEET 1 OF 2
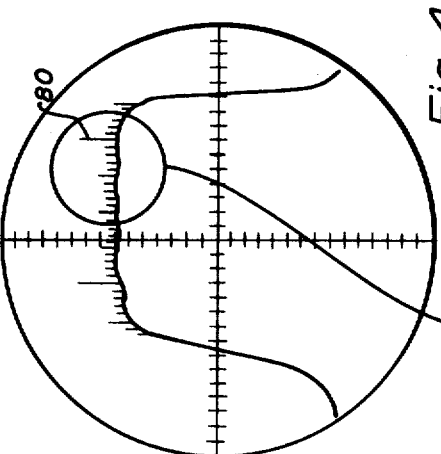
Fig_4
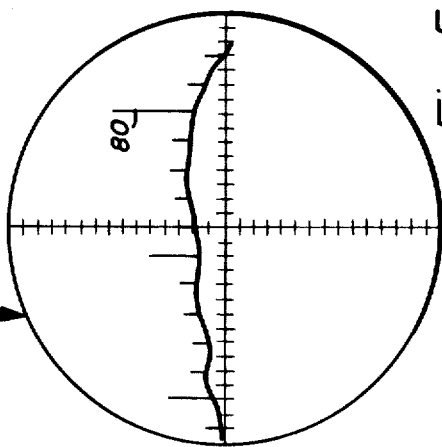
Fig_5
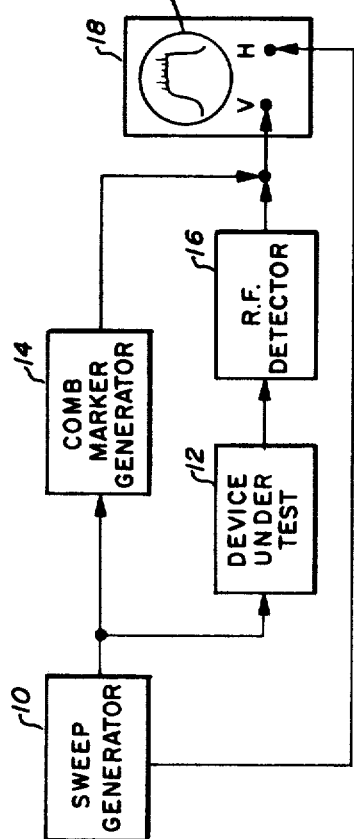
Fig_1
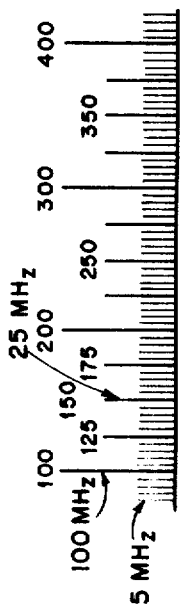
Fig_3
INVENTOR.
JOSE LUIS HERRERO
BY *Harvey J. Lowhurst*
ATTORNEY 3,593,184

COMB MARKER GENERATING APPARATUS FOR SIMULTANEOUSLY PROVIDING A PLURALITY OF MARKER PULSES AT DIFFERENT INDIVIDUALLY IDENTIFIABLE MARKER INTERVALS

BACKGROUND OF THE INVENTION

The present invention relates generally to electronic marker generator apparatus and, more particularly, to a novel comb marker generator for providing marker pulses at a plurality of marker intervals which may be simultaneously displayed in a manner that enables visual identification of the respective intervals.

Comb marker generators are devices for providing pulses at predetermined frequency intervals which are added to a test signal to precisely indicate those intervals as the frequency of the test signal is swept over a selected range of frequencies. Most prior art techniques for generating frequency markers with crystal accuracy are based upon the frequency mixing of two signals, one of which is a variable frequency and the other being a reference frequency. The reference signal is produced by a crystal-controlled oscillator and is applied to a harmonic generator that will provide a strong harmonic spectrum up to the highest frequency to be marked. Mixing of the variable signal with the harmonics produced by the harmonic generator gives a low frequency product output any time there is coincidence between the unknown variable signal and one of the harmonics of the reference frequency. This coincidence signal, when amplified in a video amplifier having low noise characteristics, gives an output equivalent to a marker pulse.

The present state of the art in devices capable of generating a harmonic frequency spectrum that extends over a larger number of octaves up to microwave frequencies is such that when the frequency of the reference is decreased, i.e., the marker interval narrowed, the amplitude of the harmonics rapidly deteriorates down into the noise level and becomes unusable as a factor of the number of harmonics required to be generated. The power of the signal that can be applied to a harmonic generator is also limited by the state of the art of the components. In addition to the prior art difficulties with generating a large number of pulses for high frequency application, there is an additional disadvantage inherent in present marker generator apparatus resulting from the difficulties encountered in identifying the frequency of a given marker pulse particularly when only a portion of a given spectrum is being viewed on an oscilloscope or x-y recorder.

As mentioned above, in most apparatus used today, the marker generator samples an unknown RF from a swept source and mixes this sample with harmonics produced by a crystal oscillator. The mixer output is then channeled to a low noise video amplifier and combined with the vertical input to an oscilloscope or x-y recorder. Whereas in these types of devices it is relatively easy to produce marker intervals of 5, 10, 50, or 100 MHz. over short frequency spreads, it is very difficult to produce the lower marker intervals over a wide frequency spread because of the sheer number of pulses required over the wider spread and the lack of sufficient pulse forming technology in the present state of the art.

Another disadvantage of prior art apparatus is that it is not possible to provide simultaneously, markers at a number of different intervals. For example, if one desires to have marker intervals of 100 MHz. then the displays are limited to that interval. However, the device may be switched, for example, to 50 MHz. intervals, or 10, or 5 MHz. intervals, but no provision is made for displaying more than one interval simultaneously in a manner so that they can be differentiated one from the other.

OBJECTS OF THE INVENTION

It is therefore a primary object of the present invention to provide a novel marker generator apparatus which is capable of producing marker pulses at any desired intervals and over any range of signal frequency.

Another object of the present invention is to provide a novel marker generator apparatus which is capable of simultaneously producing marker pulses at different marker intervals which can be visually distinguished from each other.

Still another object of the present invention is to provide a novel marker generator apparatus for selectively generating marker pulses at one or more selected frequency intervals which can be displayed individually or simultaneously and which have single pulse characteristics which enable the respective markers at one marker interval to be distinguished from those indicating other frequency intervals.

SUMMARY OF THE INVENTION

In accordance with the present invention, a means is provided for generating a harmonic spectrum of a reference frequency high enough to make it a simple matter to obtain enough harmonics to cover the desired frequency range. The unknown signal is then mixed with the harmonic spectrum and the resultant coincidence signals are used to provide marker pulses at the reference frequency. In order to simultaneously provide marker pulses at frequency intervals of less than the selected reference frequency, the resultant coincidence signals are mixed with submultiples of the first reference frequency to provide marker pulses at smaller intervals which can then be added to the reference marker pulses to simultaneously provide markers at any desired frequency intervals.

Since each of the intervals selected are derived from independent sources, means can be provided at each source for controlling the amplitude or other characteristic of the pulses produced by the respective sources and thus when mixed together with the markers corresponding to the other intervals a slide-rule-type display may be provided which enables easy recognition of the respective intervals in the output display.

A primary advantage of the present invention over the prior art devices is that there is no practical limit to the number of marker pulses which can be provided over a given frequency range since only a few harmonics are required in each source to generate the smaller interval pulses. Any marker interval can be selectively chosen and displayed simultaneously with other marker intervals and the characteristics of the pulses used to mark the various intervals can be chosen to be different so that the various intervals simultaneously displayed can be differentiated one from the other.

These and other advantages of the present invention will become apparent to those skilled in the art after having read the following detailed disclosure which makes reference to the several figures of the drawing.

IN THE DRAWING

FIG. 1 is a block diagram illustrating one manner in which a comb marker generator may be used to test a given device.

FIG. 3 is an illustration of the type of marks which can be produced using the present invention.

FIG. 4 is an illustration of a frequency response signal marked using the present invention.

FIG. 5 is an illustration of an amplified portion of the frequency response signal of FIG. 4.

DETAILED DESCRIPTION OF A PREFERRED EMBODIMENT

Figure 2:
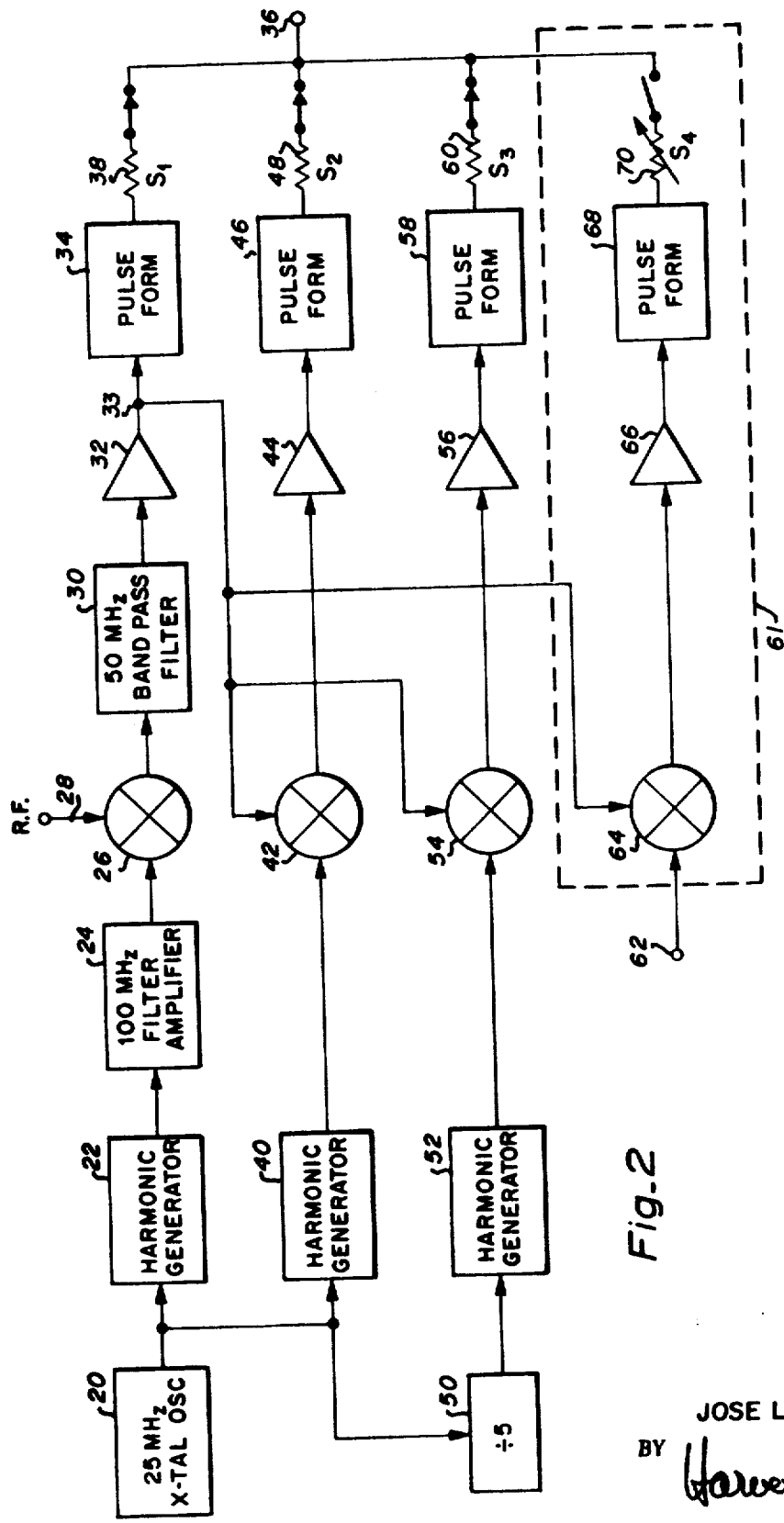
FIG. 2 is a block diagram of a comb marker generator in accordance with the present invention.

Turning now to FIG. 1 of the drawing, there is shown a typical frequency response test setup of the type in which a comb marker generator is used as an aid in the examination of the linearity of a device under test. In this type of test setup, a sweep generator 10 provides an input signal to a device 12 under test and the input signal is swept over a given range of frequencies. The output signal of the generator 10 is also provided to a comb marker generator 14 which generates pulses in response thereto at selected frequency intervals. An RF detector 16 is provided for converting the frequency response for the test device 12 to an output signal in a form which can be input into the oscilloscope 18 to produce a meaningful frequency response waveform.

In order that the marker pulses may be caused to appear on the face of the scope along with the frequency response curve, the output of the comb marker generator 14 is added to the output of the RF detector 16 before being introduced into the scope 18. Although this is the typical manner in which the generator output is introduced into the scope, in some applications where a dual trace scope is available the comb marker generator output will be fed directly to one trace input while the test response will be fed directly to the other trace input. In any case, the curve and markers appearing on the face of the scope will enable the operative characteristics of the device under test to be evaluated.

Referring now to FIG. 2 of the drawing, there is shown a block diagram of a marker generator apparatus in accordance with the present invention. For purposes of illustration, a reference frequency of 100 MHz. has been chosen and although this frequency may be obtained in a number of ways, a preferred manner is to utilize a 25 MHz. crystal oscillator 20 to feed a harmonic generator 22 which produces a number of harmonics including those of the 100 MHz. signal desired. The 100 MHz. signal is then separated from the other harmonics by a filter 24 and is amplified and introduced into a harmonic mixer 26, as the local oscillator frequency, along with the RF sweep signal introduced at 28.

The mixer 26 will produce a low frequency difference output which periodically goes to zero indicating coincidence between the unknown signal and one of the harmonics of the reference frequency. This low frequency signal is then fed through a 50 MHz. band-pass filter 30 and is amplified by an amplifier 32 before being supplied to a pulse-forming circuit 34. It will be understood that as the RF signal frequency proceeds from coincidence with one harmonic of the reference to coincidence with the next harmonic, the frequency of the signal appearing at point 33 will vary from zero to 50 MHz. and then back to zero, the zero frequencies, of course, indicating coincidence of the input signals to the mixer 26. The pulse-forming circuit 34 may be of the Schmidt type which produces a pulse each time that a zero beat occurs. These pulses are then coupled to the output terminal 36 through a resistor 38 to produce the desired markers at 100 MHz. intervals.

In order to generate another set of marker pulses at a different marker interval the output of the crystal oscillator 20 is also fed into a second harmonic generator 40 which generates the harmonics of the 25 MHz. source. The resultant output of the generator 40 is fed into a harmonic mixer 42 along with the low frequency signal appearing at point 33 in the previously described circuit. The output of the mixer 42 is then amplified by an amplifier 44 and fed to a pulse-forming circuit 46. Since, in this case, the reference frequency is now 25 MHz. and the low frequency output at 33 provides the other input to the mixer 42, a coincidence signal, or zero beat, will generated by the mixer 42 at 25 MHz. intervals of the RF sweep signal.

It will be noted that since the signal appearing at point 33 varies from 0 MHz. up to 50 MHz. and then from 50 MHz. back down to 0 MHz. for each 100 MHz. sweep of the RF sweep signal, it is only necessary that the harmonic generator 40 provide two harmonics, namely, those at 25 MHz. and 50 MHz. in order that coincidence can be obtained in the mixer 42 at 25 MHz. intervals. This is so because the 0 and 100 MHz. beats are provided by the 100 MHz. marker generator system. The fact that only two harmonics are required substantially reduces cost and technical problems which would otherwise be involved in generating a 25 MHz. harmonic spectrum up through the microwave frequencies. In response to each coincidence signal, the pulse-forming circuit 46 will produce a marker pulse. By selecting an appropriate value for the resistor 48, the amplitude of the pulses caused to appear at terminal 36 at 25 MHz. intervals can be made different from those applied by the pulse-forming circuit 34 and thus are distinguishable therefrom at the output terminal 36.

Similarly, marker pulses at 5 MHz. intervals can be provided by dividing the output of the crystal oscillator 20 by 5 using the divider 50 and supplying this 5 MHz. signal to the harmonic generator 52 to produce the harmonics of the 5 MHz. signal. Here again only a small number of harmonics are required because of the 0—50—0 repetition of the low frequency "sweep" signal obtained from point 33.

The output of generator 52 is then coupled into one of the inputs to the harmonic mixer 54 and the signal appearing at point 33 in the first-described circuit is coupled into the other causing the mixer 54 to provide a coincident signal which, when amplified by the amplifier 56, causes the pulse-forming circuit 58 to produce marker pulses at 5 MHz. intervals of the RF sweep signal. Again, an appropriate value for the resistor 60 can be chosen to make the amplitude of the pulses generated by circuit 58 distinguishable over the 25 and 100 MHz. marker pulses to which they are added at terminal 36.

As a further feature of the present invention, one or more additional stages 61 may be incorporated into the apparatus to enable the generation of marker pulses at any selected interval to be added to the output at terminal 36. The desired reference frequency can be introduced at the input terminal 62 of the mixer 64 to be mixed with the signal taken from point 33. The resultant output of the mixer 64, when amplified by amplifier 66, will cause the pulse forming circuit 68 to produce a pulse each time a zero beat occurs, and as in the above circuits, such a coincidence signal will occur at intervals of the RF sweep signal determined by the frequency of the reference signal input at terminal 62. The pulses produced by the pulse-forming circuit 68 can be distinguished from the other pulses added at terminal 36 by choosing an appropriate value for the resistor 70.

In order that any set of marker pulses or any combination of the marker pulses may be selectively chosen to appear at the output terminal 36, switches S are provided in each circuit. Moreover, any or all of the pulse amplitude determining resistors 38, 48, 60 or 70 may be made variable so that a visible contrast between the selected sets of markers can be assured. In other words, it may be desirable in certain instances that the height of a particular set of marker pulses be increased or reduced for some reason and such provision would enable this.

Having now described the operation of the present invention, reference can be made to FIG. 3 of the drawing for the purpose of illustrating one manner in which the marker generator output available at terminal 36 can be displayed. By choosing the resistors 38, 48 and 60 such that the amplitude of the pulses coupled therethrough to the output terminal 36 have amplitudes of 3, 2, and 1 units respectively, a comb marker display such as is illustrated in FIG. 3 can be provided. This easy to read slide-rule-type presentation will make it quite easy to evaluate the characteristics of a given response curve.

In FIG. 4 of the drawing, one example of a response curve having the marker pulses provided by the present invention added thereto is illustrated. Whereas it is normally difficult to choose a particular portion of a response curve, amplify it for close evaluation, as illustrated in FIG. 5, and still be able to identify the portion of the response curve which is being amplified, it will be readily apparent from the illustration of FIG. 5 that this can easily be accomplished by taking note of a prominent larger interval marking pulse such as at 80 and using this as a reference to determine the portion of the response curve being viewed.

The many advantages of the present invention will thus be apparent to those skilled in the art and it will be recognized that a solution is provided to the physical difficulty or even impossibility of producing a harmonic spectrum of usable magnitude up to very high frequencies when the basic reference a small fraction of the needed band width. This includes the generation of the required power and time response of the circuit and its elements. Moreover, the generation of the desired marker pulses in accordance with the present invention is made by coincidence detection in mixed bands instead of directly. And furthermore, a slide-rule-type presentation of the various sets of marker pulses is made possible so as to facilitate the reading of the frequency markers.

Although the present invention has been described with reference to particular frequencies, it is to be understood that these are merely for purposes of illustration and any other reference frequencies can be used. Moreover, the particular circuit elements and other apparatus used in the disclosed block diagram are not critical and it is contemplated that many alternatives will be apparent to those of skill in the art. It is therefore to be understood that the above described disclosure is by way of illustrative example only and is not to be taken as being limiting in any way. Accordingly, it is intended that the appended claims be interpreted as covering all modifications which fall within the true spirit and scope of the invention.

What I claim is:

1. A comb marker generator for generating a series of marker pulses for a variable frequency signal comprising:
   first generating means for generating a first reference signal;
   first mixer means responsive to said first reference signal and said variable frequency signal and operative to generate first difference signals commensurate with the difference of the frequency of said variable frequency signal and said first reference signal and its harmonics
   first pulse-forming circuit means responsive to a predetermined characteristic of said first difference signals and operative to develop first marker pulses in response thereto;
   second generating means for generating a second reference signal;
   second mixer means responsive to said second reference signal and said first difference signals and operative to generate second difference signals commensurate with the difference of the frequency of said first difference signals and said second reference signal and its harmonics;
   second pulse-forming circuit means responsive to a predetermined characteristic of said second difference signals and operative to develop second marker pulses in response thereto; and
   means for adding said first and second marker pulses to form the series of marker pulses.

2. A comb marker generator for generating a series of marker pulses as recited in claim 1 wherein said means for adding said first and second marker pulses is an impedance network for causing the amplitudes of said first marker pulses to be different from the amplitudes of said second marker pulses.

3. A comb marker generator as recited in claim 1 which further includes:
   third generating means for generating a third reference signal;
   third mixer means responsive to said third reference signal and said first difference signals and operative to generate third difference signals commensurate with the difference of the frequency of said first difference signals and said third reference signal and its harmonics;
   third pulse-forming circuit means responsive to a predetermined characteristic of said third difference signals and operative to develop third marker pulses in response thereto; and
   means for adding said third marker pulses to said first and second marker pulses.

4. A comb marker generator as recited in claim 3 wherein said means for adding said third marker pulses to said first and second marker pulses is an impedance network for causing the amplitude of said third marker pulses to be different from the amplitude of said first and second marker pulses.

5. Apparatus for generating a series of marker pulses for use with a variable frequency signal comprising:
   first signal-generating means for generating a first reference signal
   first mixer means for mixing said first reference signal and said variable frequency signal and for providing a first mixed signal:
   band-pass filter means responsive to said first mixed signal and operative to pass only the difference frequency portion of said first mixed signal
   first pulse-forming means responsive to said filtered first mixed signal and operative to provide first marker pulses upon the occurrence of a predetermined characteristic of said filtered first mixed signal;
   second signal generating means for generating a second reference signal, the frequency of said second reference signal being a submultiple of the frequency of said first reference signal;
   second mixer means for mixing said second reference signal and said filtered first mixed signal and for providing a second mixed signal;
   second pulse-forming means responsive to said second mixed signal and operative to provide second marker pulses upon the occurrence of a predetermined characteristic of said second mixed signal; and
   adding means for adding said first and second marker pulses to develop the series of marker pulses.

6. Apparatus for generating a series of marker pulses as recited in claim 5 wherein said adding means is a resistive network which is adjustable to cause the amplitudes of said first marker pulses to be greater than the amplitudes of said second marker pulses.

7. Appparatus for generating a series of marker pulses as recited in claim 5 which further includes:
   further signal-generating means for generating further reference signals;
   further mixer means for mixing said further reference signals and said filtered first mixed signal and for providing further mixed signals; and
   further pulse forming means responsive to said further mixed signals and operative to provide further marker pulses upon the occurrence of a predetermined characteristic of said further mixed signals, said further marker pulses being added to said first and second marker pulses by said adding means.

8. Apparatus for generating a series of marker pulses as recited in claim 7 wherein said adding means includes an impedance network for adjusting the respective amplitudes of said first, second and further marker pulses to have a predetermined relationship.

9. A comb marker generator in accordance with claim 1 in which the frequency of said second reference signal is a submultiple of the frequency of said first reference signal.

10. A comb marker in accordance with claim 9 which further includes a band pass filter for filtering said first difference signals, the pass band of said filter extending from substantially zero frequency to a frequency which is substantially one-half of the desired frequency separation between immediately adjacent first marker pulses.

11. A comb marker generator in accordance with claim 3 in which the frequency of said third reference signal is a submultiple of the frequency of said second reference signal and in which the frequency of said second reference signal is a submultiple of the frequency of said first reference signals.

12. Apparatus in accordance with claim 5 in which the band pass of said filter means extends from substantially zero frequency to a frequency which is about one-half of the desired frequency separation between adjacent first marker pulses.

13. Apparatus in accordance with claim 12 in which said first reference signal is comprised of a first reference frequency and its harmonics and said second reference frequency is comprised of a second reference frequency and its harmonics.

14. Apparatus in accordance with claim 12 in which said first and second mixer means are harmonic mixers to generate mixed signals including difference frequencies of the reference signals and their harmonics.